(12) United States Patent
Kovvali et al.

(10) Patent No.: US 8,799,480 B2
(45) Date of Patent: Aug. 5, 2014

(54) CONTENT PRE-FETCHING AND CDN ASSIST METHODS IN A WIRELESS MOBILE NETWORK

(75) Inventors: Surya Kumar Kovvali, Westborough, MA (US); Charles Boyle, Upton, MA (US)

(73) Assignee: Movik Networks, Westford, MA (US)

( * ) Notice: Subject to any disclaimer, the term of this patent is extended or adjusted under 35 U.S.C. 154(b) by 111 days.

(21) Appl. No.: 13/185,066

(22) Filed: Jul. 18, 2011

(65) Prior Publication Data
US 2012/0191862 A1 Jul. 26, 2012

Related U.S. Application Data

(60) Provisional application No. 61/365,401, filed on Jul. 19, 2010.

(51) Int. Cl.
*G06F 15/16* (2006.01)
*G06F 13/00* (2006.01)
*H04L 29/08* (2006.01)
*H04W 88/18* (2009.01)

(52) U.S. Cl.
CPC ............. *H04L 67/28* (2013.01); *H04L 67/2842* (2013.01); *H04W 88/182* (2013.01)
USPC ............................. 709/227; 711/126; 711/133

(58) Field of Classification Search
USPC ........................................................ 709/227
See application file for complete search history.

(56) References Cited

U.S. PATENT DOCUMENTS

| 6,185,598 B1 | 2/2001 | Farber et al. |
| 6,338,046 B1 | 1/2002 | Saari et al. |
| 6,389,422 B1 | 5/2002 | Doi et al. |
| 6,615,267 B1 | 9/2003 | Whalen et al. |

(Continued)

FOREIGN PATENT DOCUMENTS

| EP | 2197187 A1 | 6/2010 | |
| WO | 2008/076073 A1 | 6/2008 | |
| WO | WO 2010/060438 A1 * | 11/2008 | ............. G06Q 30/00 |

OTHER PUBLICATIONS

Cao & Irani, Cost-Aware WWW Proxy Caching Algorithms, USENIX Symposium on Internet Technologies and Systems (1997.*

(Continued)

*Primary Examiner* — David Lazaro
*Assistant Examiner* — Robert Shaw
(74) *Attorney, Agent, or Firm* — Nields, Lemack & Frame, LLC

(57) ABSTRACT

The current invention is applicable to a RAN-cache or proxy operating in a wireless mobile network that is functioning as a transparent inline device intercepting wireless mobile protocols such as UMTS, LTE, WIMAX, CDMA etc.), or a traffic off-load device connected to multiple interfaces towards the Core/Internet. The current invention identifies methods for pre-fetching content by emulating portions of a mobile client for gaining connectivity through the mobile-core network, or to use session contexts of other mobile clients in a way not to significantly effect charging and billing for the preloaded content. The pre-load decision of what to pre-load and when to pre-load may be locally derived within the RAN-cache/Proxy device, or in-coordination with a locally connected CDN (Content Delivery Network) device. Other embodiments of the current invention include the RAN-cache/Proxy providing interconnectivity from the locally connected CDN device to other CDN devices through the Mobile Core Network (SGSN/GGSN in UMTS, S-GW/P-GW in LTE etc.).

4 Claims, 7 Drawing Sheets

(56) References Cited

U.S. PATENT DOCUMENTS

| | | | |
|---|---|---|---|
| 6,694,349 B1 | 2/2004 | Zou | |
| 6,907,501 B2 | 6/2005 | Tariq et al. | |
| 6,996,085 B2 | 2/2006 | Travostino et al. | |
| 7,039,672 B2 | 5/2006 | Wu et al. | |
| 7,292,538 B1 | 11/2007 | O'Rourke et al. | |
| 7,295,830 B2 | 11/2007 | Lippelt | |
| 7,318,100 B2 | 1/2008 | Demmer et al. | |
| 7,499,401 B2 | 3/2009 | Buddhikot et al. | |
| 7,568,071 B2 | 7/2009 | Kobayashi et al. | |
| 7,603,131 B2 | 10/2009 | Wang et al. | |
| 7,656,841 B2 | 2/2010 | Brouet et al. | |
| 7,739,383 B1 | 6/2010 | Short et al. | |
| 7,801,530 B2 | 9/2010 | Oswal et al. | |
| 7,844,215 B2 | 11/2010 | Vance et al. | |
| 7,933,290 B2 | 4/2011 | Aholainen | |
| 7,933,920 B2 | 4/2011 | Kojima et al. | |
| 7,991,905 B1 | 8/2011 | Roussos et al. | |
| 7,995,603 B2 | 8/2011 | Revital et al. | |
| 8,111,630 B2 | 2/2012 | Kovvali et al. | |
| 8,161,158 B2 | 4/2012 | Curcio et al. | |
| 8,180,914 B2 | 5/2012 | Klein | |
| 8,190,674 B2 | 5/2012 | Narayanan et al. | |
| 8,195,763 B2 | 6/2012 | Knowles et al. | |
| 8,208,430 B2 | 6/2012 | Valmikam et al. | |
| 2002/0059440 A1 | 5/2002 | Hudson et al. | |
| 2003/0003919 A1 | 1/2003 | Beming et al. | |
| 2003/0115421 A1 | 6/2003 | McHenry et al. | |
| 2003/0120805 A1 | 6/2003 | Couts et al. | |
| 2003/0195977 A1 | 10/2003 | Liu et al. | |
| 2004/0068571 A1 | 4/2004 | Ahmavaara | |
| 2004/0098748 A1 | 5/2004 | Bo et al. | |
| 2004/0223505 A1 | 11/2004 | Kim et al. | |
| 2004/0240390 A1 | 12/2004 | Seckin | |
| 2004/0264368 A1 | 12/2004 | Heiskari et al. | |
| 2005/0097085 A1* | 5/2005 | Shen et al. | 707/3 |
| 2005/0117558 A1 | 6/2005 | Angermann et al. | |
| 2005/0135428 A1 | 6/2005 | Hellgren | |
| 2005/0136973 A1 | 6/2005 | Llamas et al. | |
| 2005/0157646 A1 | 7/2005 | Addagatla et al. | |
| 2006/0018294 A1 | 1/2006 | Kynaslahti et al. | |
| 2006/0117139 A1* | 6/2006 | Kobayashi et al. | 711/118 |
| 2006/0159121 A1 | 7/2006 | Sakata et al. | |
| 2006/0167975 A1* | 7/2006 | Chan et al. | 709/203 |
| 2006/0274688 A1 | 12/2006 | Maxwell et al. | |
| 2007/0025301 A1 | 2/2007 | Petersson et al. | |
| 2007/0113013 A1* | 5/2007 | Knoth | 711/128 |
| 2007/0117558 A1 | 5/2007 | Balwani | |
| 2007/0143218 A1 | 6/2007 | Vasa | |
| 2007/0171886 A1 | 7/2007 | Lewis et al. | |
| 2007/0174428 A1* | 7/2007 | Lev Ran et al. | 709/218 |
| 2007/0198716 A1 | 8/2007 | Knowles et al. | |
| 2007/0223379 A1 | 9/2007 | Sivakumar et al. | |
| 2007/0230342 A1 | 10/2007 | Skog | |
| 2007/0254671 A1 | 11/2007 | Liu | |
| 2008/0026789 A1 | 1/2008 | Llamas et al. | |
| 2008/0052366 A1* | 2/2008 | Olsen et al. | 709/206 |
| 2008/0082753 A1* | 4/2008 | Licht et al. | 711/128 |
| 2008/0108345 A1 | 5/2008 | Calin et al. | |
| 2008/0139112 A1 | 6/2008 | Sampath et al. | |
| 2008/0162713 A1 | 7/2008 | Bowra et al. | |
| 2008/0186912 A1 | 8/2008 | Huomo | |
| 2008/0191816 A1 | 8/2008 | Balachandran et al. | |
| 2008/0195745 A1 | 8/2008 | Bowra et al. | |
| 2008/0207200 A1 | 8/2008 | Fein et al. | |
| 2008/0273533 A1 | 11/2008 | Deshpande | |
| 2008/0320151 A1* | 12/2008 | McCanne et al. | 709/228 |
| 2009/0019178 A1 | 1/2009 | Melnyk et al. | |
| 2009/0019229 A1* | 1/2009 | Morrow et al. | 711/137 |
| 2009/0024835 A1* | 1/2009 | Fertig et al. | 712/207 |
| 2009/0029644 A1 | 1/2009 | Sue et al. | |
| 2009/0043906 A1 | 2/2009 | Hurst et al. | |
| 2009/0055467 A1 | 2/2009 | Petersen | |
| 2009/0156213 A1 | 6/2009 | Spinelli et al. | |
| 2009/0196233 A1 | 8/2009 | Zhu et al. | |
| 2009/0210904 A1 | 8/2009 | Baron et al. | |
| 2009/0274224 A1 | 11/2009 | Harris | |
| 2009/0287842 A1* | 11/2009 | Plamondon | 709/233 |
| 2009/0291696 A1* | 11/2009 | Cortes et al. | 455/466 |
| 2010/0008290 A1 | 1/2010 | Fischer | |
| 2010/0020685 A1 | 1/2010 | Short et al. | |
| 2010/0023579 A1 | 1/2010 | Chapweske et al. | |
| 2010/0034089 A1 | 2/2010 | Kovvali et al. | |
| 2010/0057883 A1 | 3/2010 | Cao et al. | |
| 2010/0057887 A1* | 3/2010 | Wang et al. | 709/219 |
| 2010/0067378 A1* | 3/2010 | Cohen et al. | 370/231 |
| 2010/0085947 A1 | 4/2010 | Ringland et al. | |
| 2010/0085962 A1 | 4/2010 | Issaeva et al. | |
| 2010/0088369 A1* | 4/2010 | Sebastian et al. | 709/203 |
| 2010/0106770 A1 | 4/2010 | Taylor et al. | |
| 2010/0125868 A1 | 5/2010 | Foladare et al. | |
| 2010/0158026 A1 | 6/2010 | Valmikam et al. | |
| 2010/0161756 A1* | 6/2010 | Lewis et al. | 709/217 |
| 2010/0178914 A1 | 7/2010 | Fischer et al. | |
| 2010/0184421 A1 | 7/2010 | Lindqvist et al. | |
| 2010/0195602 A1 | 8/2010 | Kovvali et al. | |
| 2010/0205375 A1* | 8/2010 | Challener et al. | 711/118 |
| 2010/0215015 A1 | 8/2010 | Miao et al. | |
| 2010/0215019 A1 | 8/2010 | Velev et al. | |
| 2010/0215057 A1 | 8/2010 | Frink et al. | |
| 2010/0235503 A1 | 9/2010 | Sitaraman et al. | |
| 2010/0272021 A1 | 10/2010 | Kopplin et al. | |
| 2010/0325334 A1* | 12/2010 | Tsai et al. | 710/308 |
| 2011/0167170 A1 | 7/2011 | Kovvali et al. | |
| 2011/0202634 A1 | 8/2011 | Kovvali et al. | |
| 2011/0243553 A1* | 10/2011 | Russell | 398/25 |
| 2012/0099533 A1 | 4/2012 | Kovvali et al. | |
| 2012/0184258 A1 | 7/2012 | Kovvali et al. | |
| 2013/0246638 A1 | 9/2013 | Kovvali et al. | |

OTHER PUBLICATIONS

Joe Cooper The Book of Webmin (2003) Ch. 12—Squid.*

Grassi, "Prefetching Policies for Energy Saving and Latency Reduction in a Wireless Broadcast Data Delivery System," Proceedings of the 3rd International Workshop on Modeling Analysis and Simulation of Wireless and Mobil Systems (MSWIM '00 ), ACM, 2000, pp. 77-84.*

Yin et al, "Power-Aware Prefetch in Mobile Environments," Proceedings of the 22 nd International Conference on Distributed Computing Systems (ICDCS'02), IEEE (2002).*

Jin et al An Integrated Prefetching and Caching Scheme for Mobile Web Caching System, Eighth ACIS International Conference on Software Engineering, Artificial Intelligence, Networking, and Parallel/Distributed Computing, IEEE (2007).*

Cao et al, Cost-Aware WWW Proxy Caching Algorithms, USENIX Symposium on Internet Technologies and Systems (1997).*

Dilley et al, Enhancement and Validation of Squid's Cache Replacement Policy HP Labs Report No. HPL-1999-69, (May 1999).*

Office Action mailed Oct. 23, 2012 in co-pending U.S. Appl. No. 12/696,378.

Office Action mailed Jan. 2, 2013 in co-pending U.S. Appl. No. 13/339,629.

International Search Report/Written Opinion mailed Feb. 29, 2012 in co-pening PCT application No. PCT/US2011/044156.

International Search Report/Written Opinion mailed Feb. 29, 2012 in corresponding PCT application No. PCT/US2011/044361.

International Preliminary Report on Patentability mailed Feb. 23, 2012 in co-pending PCT application No. PCT/US09/52871.

Notice of Allowance mailed Apr. 12, 2012 in co-pending U.S. Appl. No. 12/645,009.

Final Rejection mailed Oct. 29, 2013 in co-pending U.S. Appl. No. 13/048,378.

Notice of Allowance mailed Sep. 19, 2013 in co-pending U.S. Appl. No. 13/339,629.

Office Action mailed Dec. 10, 2012 in co-pending U.S. Appl. No. 13/025,839.

Final Rejection mailed May 16, 2013 in co-pending U.S. Appl. No. 13/025,839.

Office Action mailed Sep. 30, 2013 in co-pending U.S. Appl. No. 13/025,839.

(56) References Cited

OTHER PUBLICATIONS

Office Action dated Mar. 15, 2011 in co-pending U.S. Appl. No. 12/536,537.
International Search Report/Written Opinion dated Oct. 6, 2009 in co-pending international application PCT/US2009/052871.
International Search Report/Written Opinion dated Mar. 1, 2010 in co-pending international application PCT/US2009/069260.
International Search Report/Written Opinion dated Mar. 12, 2010 in co-pending international application PCT/US2010/22542.
RFC 1644-T/TCP—TCP Extensions for Translations Functional Specification, Jul. 1994—http://www.faqs.org/rfcs/rfc1644.html, 38 pages, R. Braden, et al.
RFC 3135—Performance Enhancing Proxies Intended to Mitigate Link-Related Degradations, Jun. 2001—http://www.faqs.org.rfcs/rfc3135.html, 48 pages, J. Border et al.
RFC 2045—Multipurpose Internet Mail Extensions (MIME) Part One: Formal of Internet Message Bodies; Nov. 1996—http://www.faqs.org/rfcs/rfc2045.html, 34 pages, N. Freed, et al.
International Search Report/Written Opinion dated May 13, 2011 in co-pending international application PCT/US2011/28477.

3GPP TR 23.829 V0.4.0 (Jan. 2010), Technical Report, "3rd Generation Partnership Project; Technical Specification Group Services and System Aspects; Local IP Access and Selected IP Traffic Offload; (Release 10)", 29 pages, 3GPP Organizational Partners.
Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.
Office Action mailed Apr. 30, 2013 in co-pending U.S. Appl. No. 13/048,378.
Notice of Allowance mailed May 29, 2013 in co-pending U.S. Appl. No. 13/339,629.
Notice of Allowance mailed Oct. 13, 2011 in co-pending U.S. Appl. No. 12/536,537.
Office Action mailed Nov. 10, 2011 in co-pending U.S. App. No. 12/645,009.
Office Action—Restriction—mailed Dec. 26, 2013 in co-pending U.S. Appl. No. 13/183,777.
Office Action mailed Mar. 5, 2014 in co-pending U.S. Appl. No. 13/025,839.

\* cited by examiner

CONTENT PRE-FETCHING AND CDN ASSIST METHODS IN A WIRELESS MOBILE NETWORK

This application claims priority to U.S. Provisional Patent Application Ser. No. 61/365,401, filed Jul. 19, 2010, the disclosure of which is incorporated herein by reference in its entirety.

BACKGROUND OF THE INVENTION

Content caching devices or web-caches that cache frequently viewed web pages, pictures and multi-media content are deployed in the internet for reducing transport latencies, and reducing download times for frequently accessed content across the internet. Similarly, web-proxies/caches are also deployed at enterprise sites to cache frequently used Internet web-content within the enterprise network.

Caching devices 10 can also be used in mobile wireless network, for example, a 3G/UMTS network 20. The wireless network includes a Radio Access Network (RAN) 21 and a Core Network (CN) 22. A typical wireless network is shown in FIG. 1.

The GGSN 3 (Gateway GPRS Service Node) connects the mobile wireless network to the IP Core Network. The Gateway GPRS Support Node (GGSN) 3 is a main component of the GPRS (General Packet Radio Service) network. The GGSN 3 is responsible for compatibility between the GPRS network and external packet switched networks, such as the Internet 1 and X.25 networks.

When viewed from an external network, the GGSN 3 appears as a router to a sub-network, because the GGSN 3 hides the GPRS infrastructure from the external network. When the GGSN 3 receives data addressed to a specific user, it checks if the user is active. If it is, the GGSN 3 forwards the data to the SGSN 4 serving the mobile user. However if the mobile user is inactive, the data are discarded, or a paging procedure is initiated to locate and notify the mobile device. For data originated within the GPRS network, the GGSN 3 routes these mobile-originated packets to the correct external network.

The GGSN 3 converts the GPRS packets coming from the SGSN 4 into the appropriate packet data protocol (PDP) format (e.g., IP or X.25) and sends them out on the corresponding packet data network. For incoming packets, the PDP addresses are converted to the GSM address of the destination user. The readdressed packets are then sent to the responsible SGSN 4. In order to accomplish this function, the GGSN 3 stores the current SGSN address of the user and its associated profile in its location register. The GGSN 3 is responsible for IP address assignment and is the default router for the connected user equipment (UE) 7. The GGSN 3 also performs authentication functions.

A Serving GPRS Support Node (SGSN) 4 is responsible for the delivery of data packets from and to the mobile stations within its geographical service area. Its tasks include packet routing and transfer, mobility management (attach/detach and location management), logical link management, and authentication and charging functions. The location register of the SGSN 4 stores location information and user profiles of all GPRS users registered with this SGSN 4.

The Radio Network Controller (or RNC) 5 is a governing element in the radio access network and is responsible for controlling the Node Bs 6 that are connected to it. The RNC 5 carries out radio resource management, some of the mobility management functions and is the point where encryption is done before user data is sent to and from the mobile. The RNC 5 connects to the SGSN (Serving GPRS Support Node) 4 in the Packet Switched Core Network.

Node B 6 is a term used to denote the base transceiver station (BTS) in the UMTS/3GPP Architecture. As in all cellular systems, such as GSM, Node B (or BTS) 6 contains radio frequency transmitter(s) and the receiver(s) used to communicate directly with the user equipment, which move freely around it.

The user equipment (UE) 7 comprises all user equipment, including handsets, smart phones and computing equipment.

Radio Access Networks (RANs), such as in GSM/GPRS, 3G/UMTS/HSDPA/HSUPA, LTE, CDMA network etc., have their own private networks (PLMN) and interconnect to the Internet/IP networks through gateway devices (GGSN in GSM/GPRS, 3G/UMTS/HSDPA/HSUPA, and PDSN in CDMA). Content caches 10 are typically deployed outside of the RAN as shown in FIG. 1. However, content caches 10 are not deployed in the RAN between the Wireless Base Station 6 and GGSN 3 or PDSN (in a CDMA Network).

One reason for this is, while the user application payloads are TCP/IP, those payloads are embedded within Radio Access Network Protocols that are specific to the specific RAN. Thus, within the RAN, application payloads are not directly visible for performing content-aware caching and other optimizations. The RAN network 20 is deployed as a transport network that transports user IP traffic (Bearer IP traffic) using either ATM or IP transports. Regardless of the type of transport, the RAN network transports the user payloads in per user/per service tunnels. Such tunnels are terminated within the PDSN or GGSN 3, which forwards the bearer IP traffic to the public IP network using IP forwarding rules. Thus in the prior art deployments, the RAN network is content un-aware.

Content caching devices cache content when a client device accesses an object (such as a web page or a URL object), for subsequent delivery if the same content is requested by the same or a different user. Thus, cache updates are triggered by client accesses. Web crawlers and other mechanisms proactively fetch content to increase cache hit ratios and other features, such as content searching functions, etc. Content Delivery Network devices proactively retrieve content from specific content servers through the internet before such content is requested by any user. Such pre-fetching reduces the latency while delivering content when requested by one or more users, and assists in delivering dynamic content for Edge Side Includes (ESI) by CDNs. Also, content servers (origin servers) redirect user requests to appropriate CDN devices through interaction with the CDN Network using DNS. While such mechanisms exist in the internet and wire-line networks, in wireless mobile networks, connections to internet data-plane sessions are established only when a user accesses the packet network (internet or private network).

Co-pending Patent Publication No. 2010/0034089, entitled "Content Caching in the Radio Access Network", filed Aug. 6, 2009, the contents of which are incorporated by reference, proposes deploying Content Aware Ran Caches in the Radio Access Network at one or more locations. A RAN-cache may be placed in a Radio Access Network, such as UMTS or LTE, where it is used to cache frequently accessed content by one or more users in local storage and serves the cached content to plurality of users per HTTP Protocols. The RAN-cache device operates as a transparent inline cache, in the sense that it intercepts the Control Plane and User Plane Protocols on the interfaces to which it is connected. It then reconstructs the objects and their corresponding references.

It would be advantageous if content could be pre-fetched before any user requests the content. It would be beneficial if this pre-fetched data could be stored in a RAN cache, for subsequent use by attached mobile users.

SUMMARY OF THE INVENTION

The current invention defines methods by which a RAN-Cache can pre-fetch locally determined content, and provides methods for a CDN device to pre-fetch content via a RAN-Cache device that interacts with UTMS/LTE network elements, such as a SGSN, a GGSN, a SGW, or a PDN GW. The RAN-Cache emulates a virtual user for pre-fetching content using a local control logic function, and/or due to external request by a locally connected CDN device. Such Pre-fetching requires the virtual user to be provisioned by the operator for network access and charging. Unlike the normal operation of the RAN-cache in which it does not initiate user sessions, in UE emulation mode using a Virtual User, it initiates and terminates user sessions for the virtual user. Per the current invention, the RAN-Cache provides a mechanism for the mobile network operator to configure the attributes of the mobile user that include IMSI (International Mobile Subscriber Identity), ISDN Number etc. for the Virtual user. The RAN-C then uses the attributes of the virtual user while initiating sessions for that virtual user. The mobile operator provisions the attributes of the virtual user, the corresponding service plan etc. in the service plane (for example HSS, RADIUS server etc.), so that when the session is initiated by RAN-cache for the virtual user, the operator's mobile core network accepts the session establishment. In this mode, it registers the virtual user with the mobile network.

Alternatively, the RAN-Cache may schedule pre-fetch requests by using the identity of one of the active user sessions. While selecting user sessions, it uses the sessions of those users that are being serviced from local cache. The rationale is that the operator's billing and charging system uses down-stream and upstream byte counts as monitored by Core Network (SGSN, GGSN, S-GW, PDN-GW). When the RAN-cache services user requests from local cache, this content is not fetched through the CN for that specific user session since the content served from local cache is transparent to the Core Network. Thus, the user is effectively given content "free of charging and billing", due to the caching of the content. However, the RAN Cache may then utilize this user session context for pre-fetching content, since this minimizes charging and billing impacts to mobile users in the operator network.

Another aspect of the current invention allows the RAN-Cache to provide network connectivity from a locally connected CDN device to the rest of the CDN Network through the operator's mobile network and internet. Such interconnectivity may be provided by emulating a UE (Virtual User) through the Operator's Core Network through a SGSN/GGSN, or a S-GW/PDN-GW, or through a local offload interface.

Another aspect of the current invention is to pre-fetch the content from a local IP offload-interface, if such an interface is available. Such an IP offload connects to a local Internet Service Provider's network, or to the operator's IP network. In other words, it does not go through the mobile core network (SGSN/GGSN) and billing charging system. Also, the IP-Offload network does not use RAN tunneling protocols, such as GTP-U, for forwarding packets through SGSN/GGSN. While pre-fetching through an IP offload network, the RAN-Cache uses NAT (Network Address Translation) to map pre-fetch requests corresponding to a user to a configured public IP Address and configured pool of TCP port numbers. Hiding private IP addresses through NAT for both TCP and UDP are well known methods in the prior art. The present invention may use NAT for pre-fetching content on behalf of user to circumvent the need for requiring a user plane tunnel for performing pre-fetch operation through the operator core network.

Yet another alternative for performing a pre-fetch, the RAN Cache may use locally configured public IP addresses, and pre-fetch without the context of any user through the IP offload network. This scenario is particularly applicable to on-deck content, which is content that an operator provides from his content network. The present invention describes a method where the RAN Cache implementing these methods receives requests from RAN interfaces, and the user IP requests are embedded within the corresponding protocols of that interface. Thus, the RAN Cache device un-wraps the protocol layers, identifies what objects need to be pre-fetched and when the pre-fetching should occur. In addition, while responding to user requests from local cache or pre-fetched content through another interface, such as a locally connected CDN and/or an offload interface, these responses have to be re-encapsulated and merged with the responses and protocol exchanges that user device is performing through the mobile Core Network (such as traffic going through SGSN/GGSN). Such a need does not arise in application and performance enhancing proxies known in the prior art.

BRIEF DESCRIPTIONS OF FIGURES

DETAILED DESCRIPTION OF THE INVENTION

Figure 3:
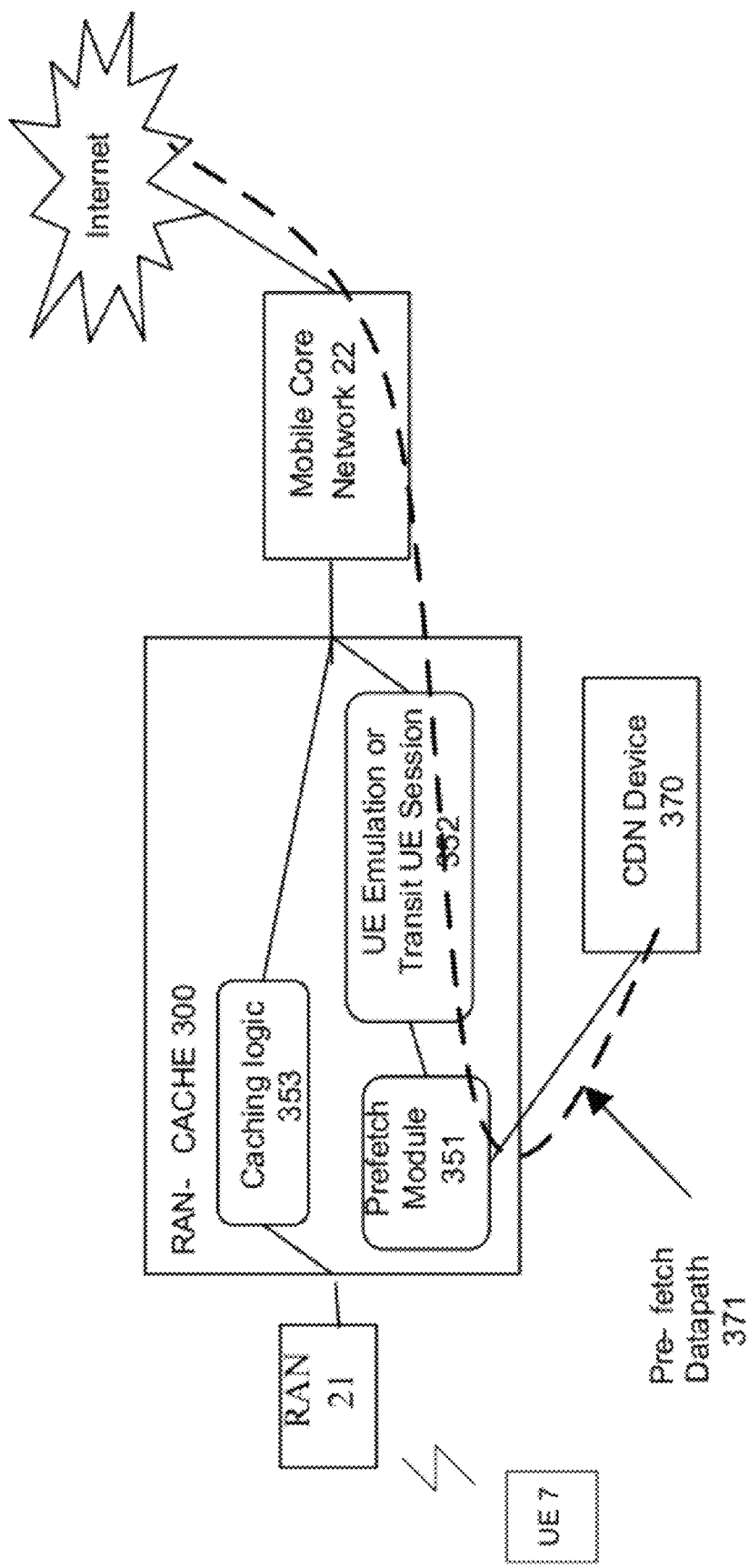
FIG. 3 shows a content pre-fetch for a CDN using a RAN cache according to one embodiment.
Figure 4:
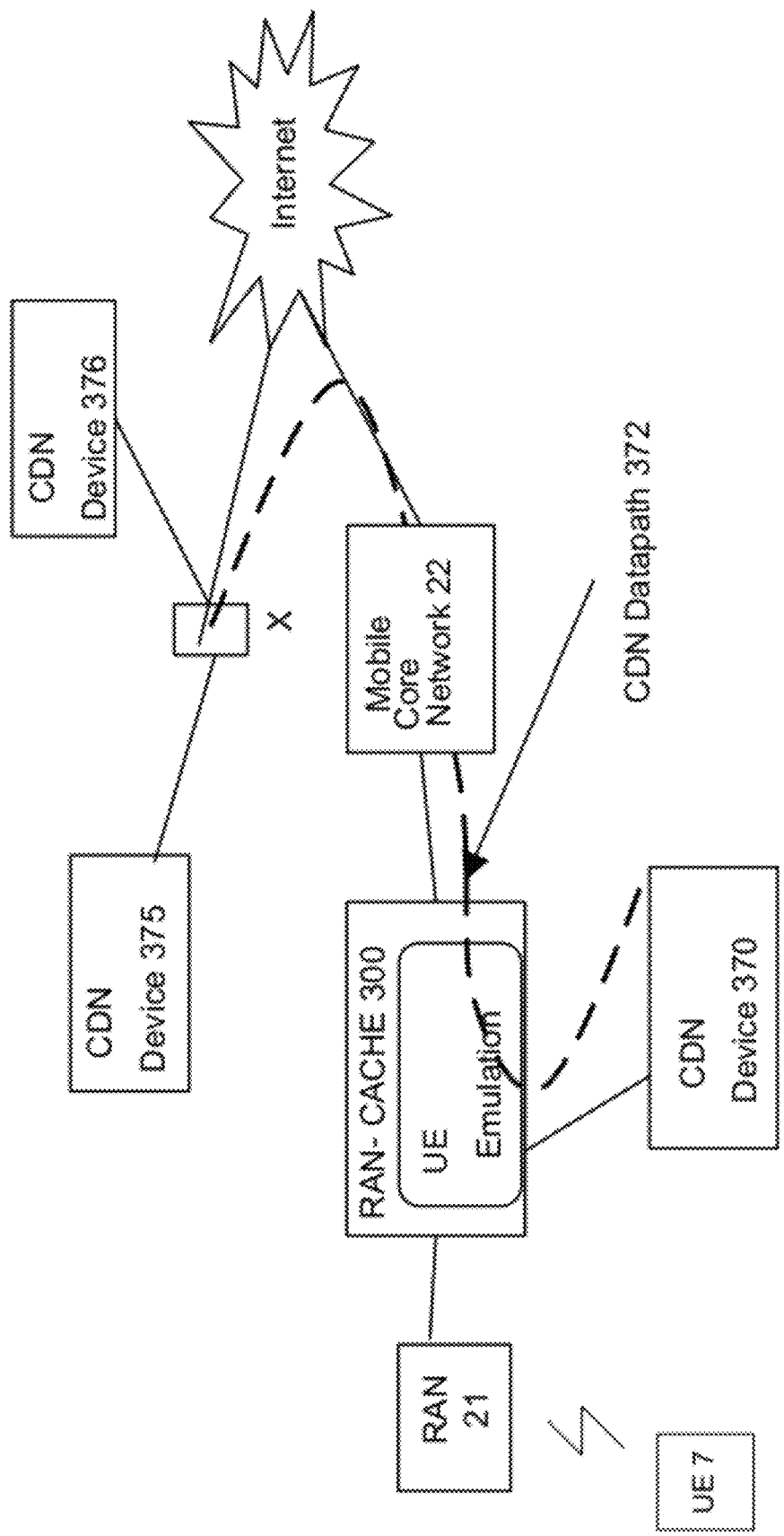
FIG. 4 shows a content pre-fetch for a CDN using a RAN cache according to another embodiment.
Figure 5:
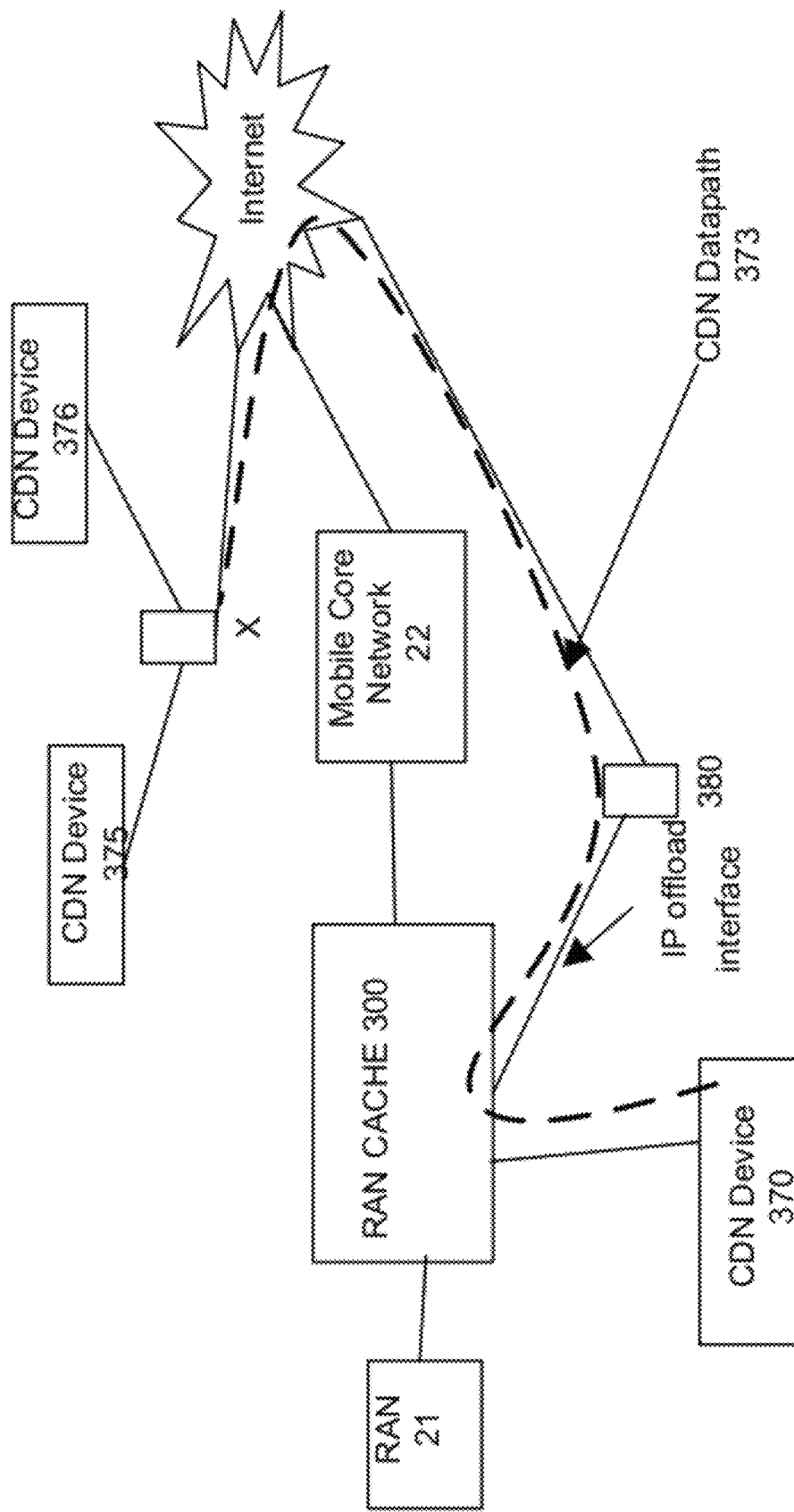
FIG. 5 shows a datapath for CDN content using the IP Traffic Offload interface.
Figure 6:
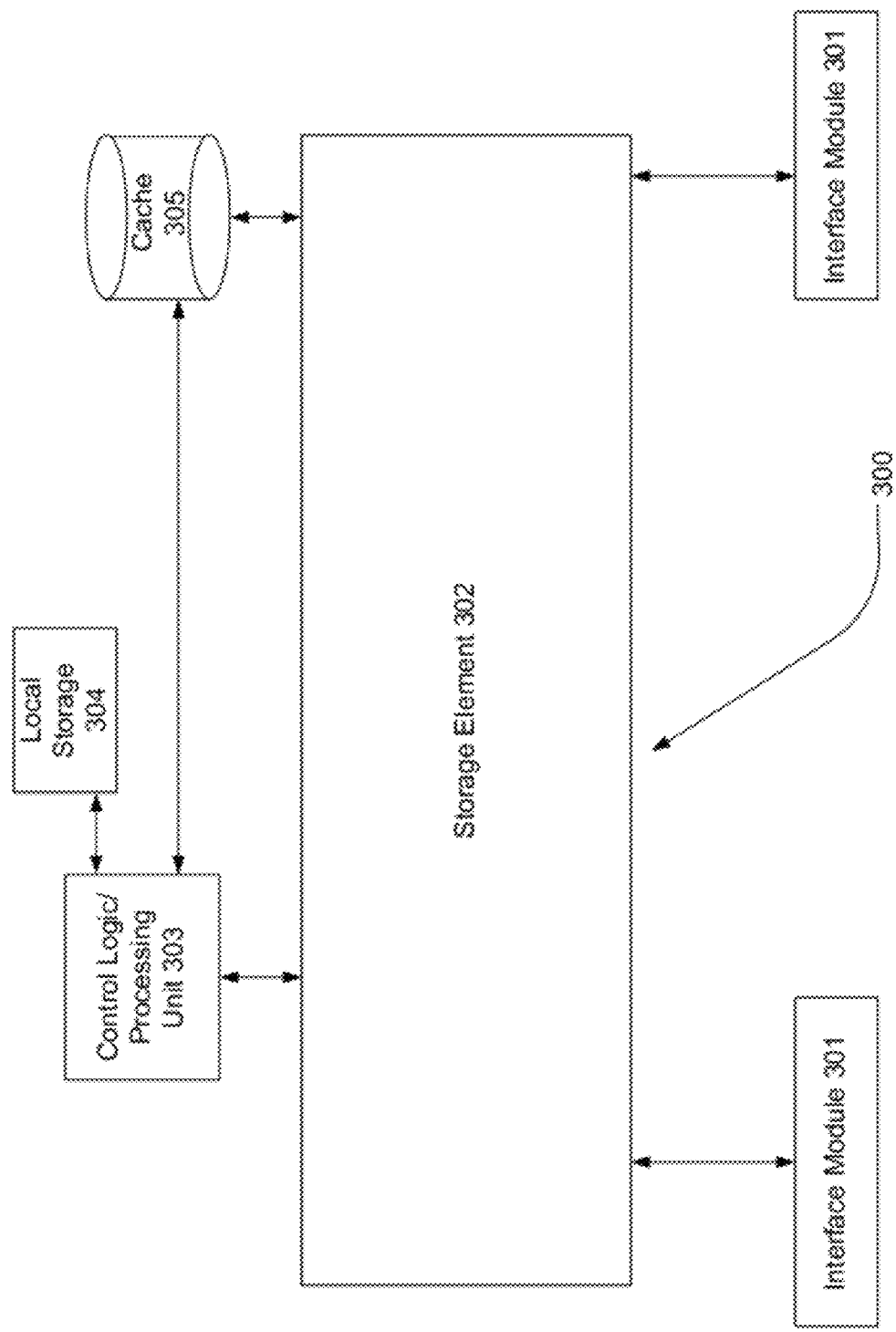
FIG. 6 is a representative block diagram of a RAN cache.

FIG. 6 shows a representative block diagram of the RANC. The RANC 300 has two interface modules 301, each of which is adapted to implement the hardware signaling required for the choice interface and the associated software protocol. This interface protocol may be IuB, IuPS or Gn, as shown in FIGS. 3-5. Each interface module 301 is adapted to receive and transmit on the selected interface. Additionally, received data is placed into a storage element 302, typically a semi-conductor storage element such as a RAM, DRAM or an equivalent technology. The movement of data from the interface module to the memory 302 and vice versa may be accomplished using dedicated hardware, such as a DMA controller. Alternatively, a dedicated data movement processor may be used to handle the actual movement of data through the RANC 300. Once stored within the RANC 300, the information is processed in accordance with the RAN specifications. This may be done using dedicated control logic or a processing unit 303. The control logic/processing unit 303 may have its own local storage element 304, which contains instructions to execute and local status. This storage element may be RAM or DRAM. In addition, at least a portion of this storage element 304 may be non-volatile, such as ROM, FLASH ROM, hard disk, Solid State Disk, or the like. Using known specifications and protocols, the control logic/processing unit 303 parses the received information to understand the packet at each protocol layer. Also included may be a large storage element 305, adapted to hold cached information. In some embodiments, this cache storage may be semiconductor memory, such as RAM or DRAM. In other embodiments, this cache storage may be a rotating media, such as a disk drive or other large storage device. The control logic/processing unit may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The RANC 300 also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

While the Figures show the RAN-C as a separate device, it may also become part of an existing component. For example, it may be embedded in an existing component, such as the RNC or SGSN and provide the functionality described above.

Figure 1:
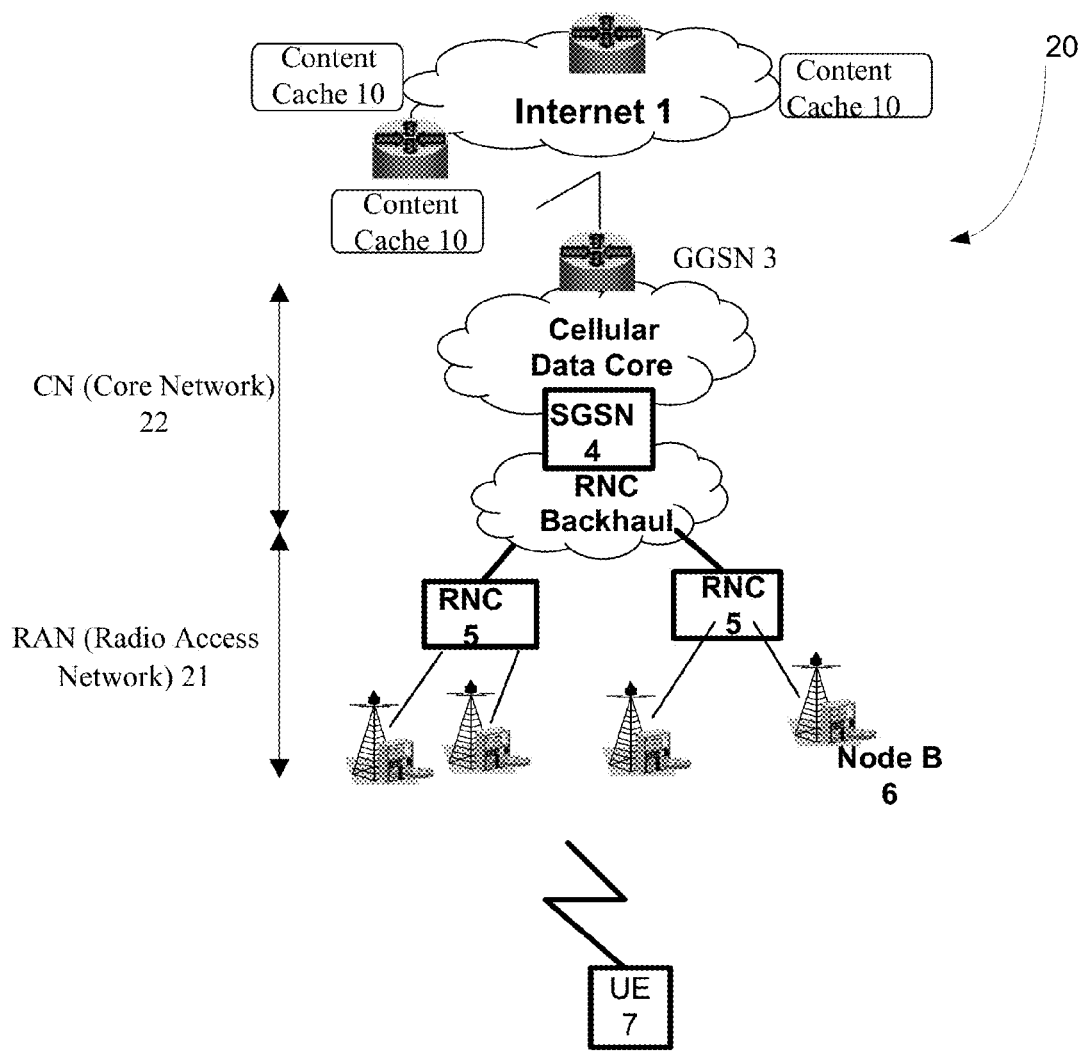
FIG. 1 illustrates a wireless network.
Figure 2:
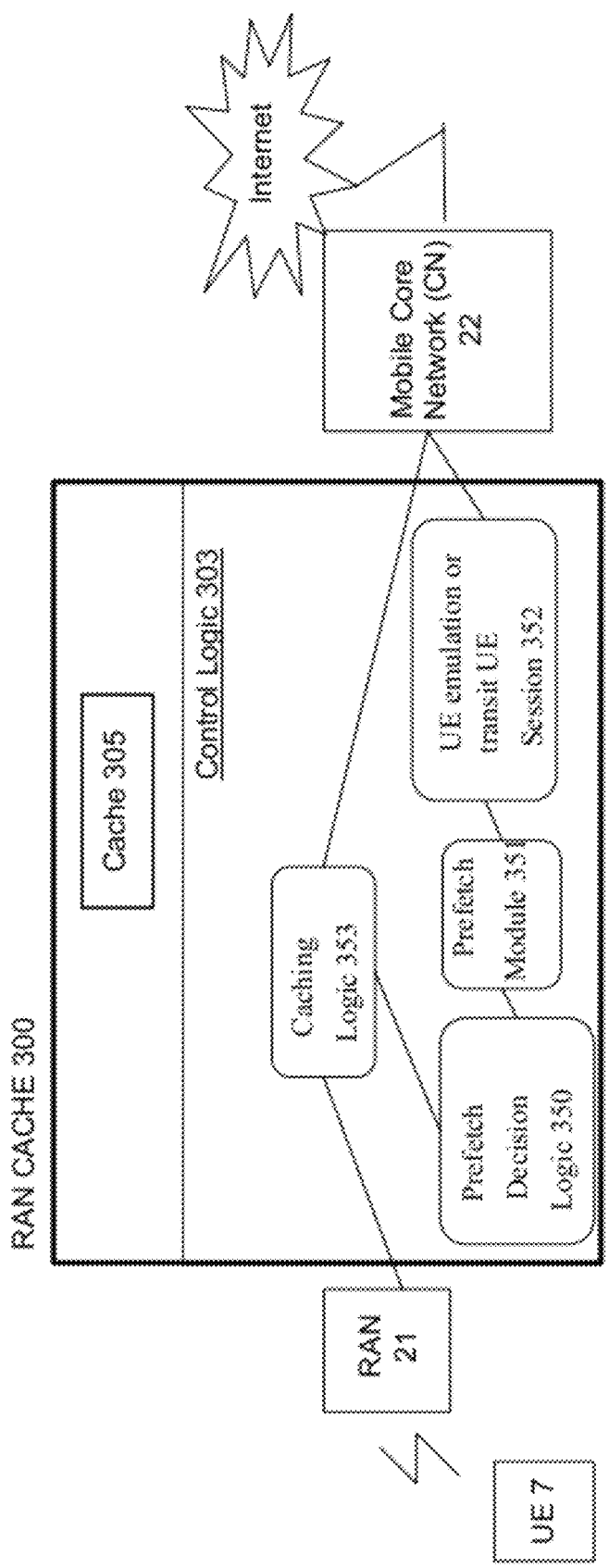
FIG. 2 shows a representative configuration according to one embodiment.

FIG. 2 shows a first configuration of the present invention. In this embodiment, the RAN-Cache 300 is a content aware inline device that monitors user sessions, populates data cache, caches local content, and serves the cached content on subsequent user sessions per the corresponding protocol rules such as HTTP 1.0/1.1 (RFC 2616) rules, as described in Co-pending Patent Publication No. 2010/0034089.

Although shown in FIG. 2 as positioned between the RAN 21 and the core network (CN) 22, the RAN cache 300 may also be positioned within the RAN 21, such as between the NodeB and the RNC, between the RNC and the SGSN or between the SGSN and the GGSN. Similarly, in a LTE network, the RAN cache may be between the eNodeB and the MME/Serving GW.

In this embodiment, the control logic 303 consists of a variety of functions. The pre-fetch 350, 351 and UE Emulation/transit UE session modules 352 are logical software components that incorporate one or more of the inventive methods identified in the present application. In this example, one function of the RAN cache is to determine what content to prefetch, as well as other parameters, such as the format of the objects, the time that the pre-fetch should occur, as well as other parameters. In some embodiments, the pre-fetch decision logic 350 makes decisions based on local configuration policy, frequency of a site's access, peak traffic/busy hour from previous history, the relationship with content publishers, types of objects and other parameters. Additional or different parameters may also be used to decide the content that should be pre-fetched.

The UE emulation or transit UE session module 352 is used to establish a connection with the mobile network. There are two ways that the RAN Cache 300 can create this connection. In a first mode, it emulates a user by creating a virtual user. In a second mode, the RAN cache uses the user session context of another actual UE. These modes are described in more detail below.

To emulate a UE (also termed Virtual UE throughout this specification), the RAN-Cache 300, using the UE emulation module 352, emulates a signaling client in the control plane and initiates and terminates the signaling connection for the virtual UE. The service plane information for the virtual UE such as but not limited to rate plan, IMSI, ISDN Number, need to be configured in the RAN Cache 300, and in the operator network. This is so that when the virtual user (i.e. the RAN Cache 300) initiates a user plane session, the session setup is accepted by the operator's Core Network 21. Once established, the user plane session created for the Virtual UE could be used for pre-fetching any content. The user plane session traverses through the CN and the charging and billing will be done for the operator provisioned virtual UE.

In a second mode, known as transit UE mode, the RAN Cache 300 adopts the identity and session context of an existing UE 7 that is being served from local cache. This approach causes the RAN Cache 300 to send a data request in the context of user sessions for data objects which the users did not specifically request, which may increases their total charges if their data plan is based on the amount of content delivered. However, the rationale for doing this is that when a UE 7 is served from RAN-Cache 300, the bytes sent over RAN 21 to the UE 7 from RAN-Cache 300 are not counted by the Operator's Core Network 22 (and Charging and Billing System). Therefore, the pre-fetched bytes are simply a replacement for the actual content that was served, but not counted by the CN 22. In this way, it is believed that the user's actual requested byte count will closely match the byte count for which he was charged. In other billing systems, total byte count is unlimited, and therefore there is no charge or inconvenience to the user because the RAN cache 300 uses this user session.

When using other UE's session context, the RAN-Cache 300 maintains a list in its storage element of UEs 7 that are currently being served from the RAN-cache 300, and the downloaded byte counts delivered from RAN-cache 300 for each UE 7. This number represents the number of bytes which were delivered to each UE 7 without the knowledge of the Operator's Core Network 22 (and Charging and Billing System). In one embodiment, the RAN cache 300 selects active UE sessions that have the highest bytes delivered from cache. In some embodiments, the RAN cache 300 then decrements this byte count by the number of bytes delivered during the pre-fetch operation. In some embodiments, the goal is to maintain each of these counters as close to zero as possible, such that unrequested pre-fetches roughly equal delivered cache content, thereby resulting an a relatively accurate byte count for each UE 7.

In another embodiment, the RAN Cache 300 accesses the UE service plan, and determines whether any of the UEs 7 have an unlimited data plan. This can be achieved through interaction with the service plane. This information comes via the HLR, through RADIUS, through PCRF or through Subscription Profile Repository (SPR). These methods are known to those skilled in the art. In this case, the RAN cache 300 can use the user session of these UEs without incurring any additional costs for those users.

In this transit UE mode, the RAN Cache 300 uses UE's sessions that have active PDP contexts. It does not initiate user plane sessions for pre-fetching content. Therefore, it may be necessary for the RAN Cache 300 to extend user sessions. For example, while the RAN Cache 300 is using a UE's session context through the core network (CN) 22 for pre-fetch, the actual UE 7 may finish its own ongoing transfers, such as the download of an object from RAN cache 300 may be completed. After the UE 7 receives its requested data, the UE 7 may initiate releasing the data session. In this case, since the RAN Cache 300 is still using that user session, the RAN Cache 300 defers releasing the signaling connection through control plane, until its pre-fetch operation is completed. While selecting a user session for such pre-fetch purposes, the RAN Cache 300 may use additional considerations, such as whether the device is connected to power source, the remaining battery power in the UE, the device type of the UE or other characteristics. Remaining battery power is important, since in one embodiment, the UE must remain in the active state in order to complete the pre-fetch operations. In another embodiment, the UE power consumption is not increased while using that UE session context for pre-fetching. This is achieved by allowing the UE to initiate a session termination and having the RAB release the connection to the UE. However, the RAN Cache 300 defers the session termination and RAB release on the core side until the prefetch operation is complete. Information, such as remaining battery power, device type and other characteristics, is obtained from the device using the methods identified in companion provisional application 61/364,560, which is incorporated by reference in its entirety. For example, the RAN Cache 300 may interpret control plane protocols to determine the type of device or other parameters.

Furthermore, in this transit UE mode, the UE 7 may have active traffic flows through the same user-plane session (for example, another UE's GTP-U session when the RAN-Cache is placed on IuPS interface). Thus, when responses are received from CN 22 interface, the RAN Cache 300 must identify the responses that should be forwarded to the UE 7 over the RAN 21, and the responses that should be forwarded to the local CDN or to be consumed locally for locally initiated pre-fetch requests.

The methods for using an existing UE 7 user session described above detail embodiments in which the UE session is active, and the RAN Cache 300 uses that user session simultaneously. As an alternative to this approach, the RAN Cache 300 may locally store the attributes of the UE's that have large contents delivered from local data cache. Then, at a later time, the RAN Cache 300 may initiate a user plane session setup by using the locally stored UE information. This method has the advantage that the RAN cache 300 could perform pre-fetch when the network usage is low (for example non busy hours), and when the specific UE 7 is not using the Operator's Core Network 22 resources. Thus pre-fetch use does not degrade the corresponding UE's QOE. As described above, UEs can be selected based on number of previously served bytes from the RAN Cache 300, or based on the UE data plan, such that user sessions are setup for UEs 7 having unlimited data plans. Additionally, the selection may be based the remaining battery power, whether it is connected to a power source, and type of UE (for example, laptop dongle, feature phone or other device.

Figure 7:
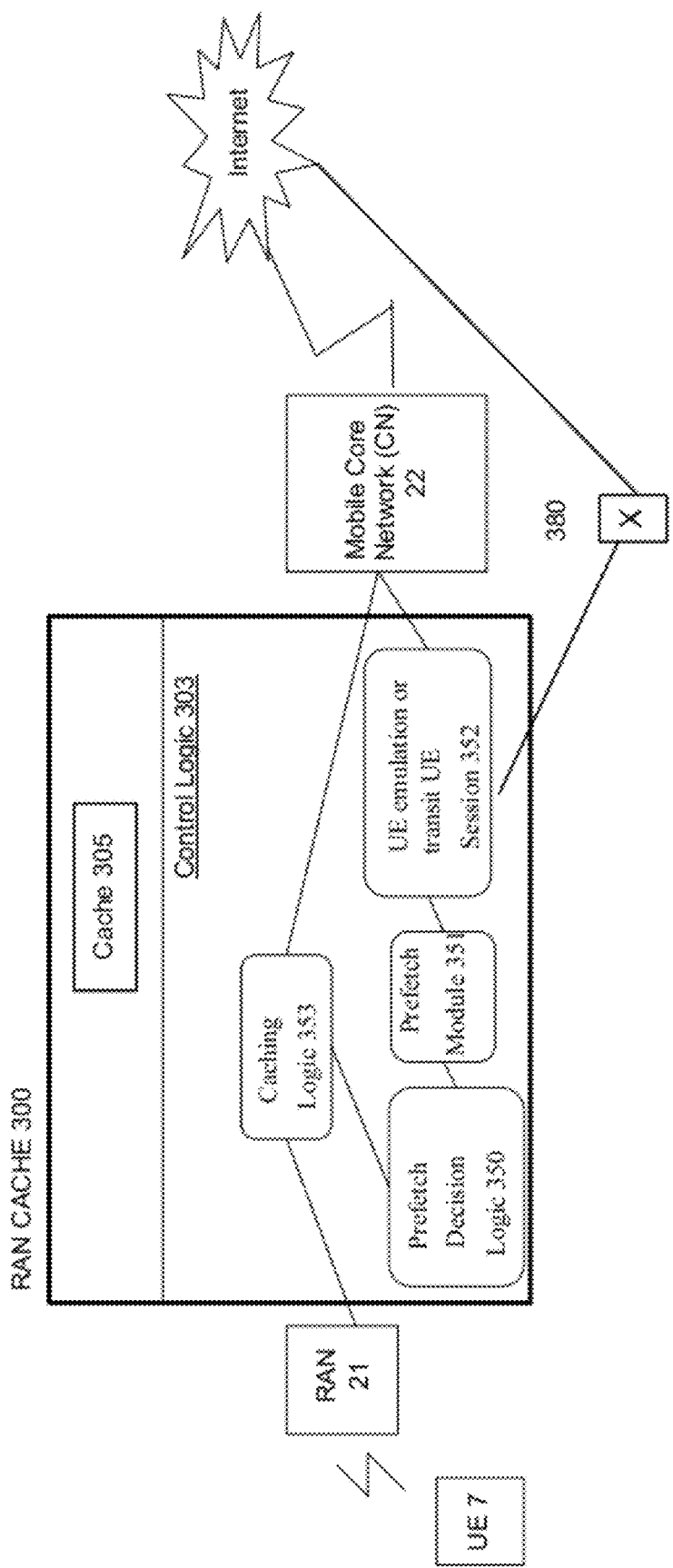
FIG. 7 shows a representation configuration using traffic offload according to one embodiment.

FIG. 7 shows an embodiment where a Traffic Offload interface is available to the RAN cache 300. In this embodiment, the RAN cache 300 determines what content to pre-fetch, and when to perform these pre-fetches, as described with reference to FIG. 2. In this configuration, a traffic offload interface 380 is available to the RAN Cache 300. The RAN cache 300 acts as a UE, using either virtual UE mode or transit UE mode. However, rather than routing the request through the core network 22, the request is routed through the traffic offload interface.

There are various algorithms that can be used to determine what content to pre-fetch. In one embodiment, the RAN Cache makes decisions by parsing the top-page requested by a user device from a website, such as www.yahoo.com. When this page is requested by a user device, the server returns the page as a html/xml object. Typically, this object contains embedded links that point to other objects at the same site or other sites. For example, links to other yahoo pages or advertisement objects that may point to other sites may be contained in the returned object. When the client starts receiving the response bytes, it may start issuing additional requests for content contained in the html page. The RAN-C, while delivering the response bytes, parses the html response object and determines which of the embedded links should be prefetched. This determination could be based on specific target sites, such as ad-delivery sites, or type of embedded link (PHP), or prior history based on how long a similar type of request previously took.

In addition to determining what content to pre-fetch, the RAN Cache 300 may determine the path through which the content should be routed. For example, a pre-fetch request may be routed through the Mobile core-network or, an offload interface, or a locally connected CDN.

Locally connected CDN device vendors have relationships with certain content publishers only, and are interested in serving only their content. These relationships are configured in RAN-Cache, indicating to the RAN Cache that such requests should be forwarded to the local CDN device. As an alternative to this static configuration, the RAN-Cache device may use a private-protocol to exchange such information. The methods used for these exchanges with the CDN device are outside the scope of the present invention.

As another example, certain web-sites may have local content/scope. The Ran Cache may have this information based on local configuration and/or the operator relationship with the corresponding content publishers. Thus, by forwarding such requests to the local offload interface, the operator network or ISP (internet service provider) would be able to serve more relevant content for the specific location.

As a further example, the operator may have specific content optimization devices, for example, HD Video content for NetFlix on the local offload network.

FIGS. 2 and 7 describe embodiments where the decision of what content to pre-fetch, and the storage of the pre-fetched data are all performed within the RAN cache 300. However, there are other embodiments, as described below.

FIG. 3 shows an external CDN device 370 that is connected to the RAN Cache 300. The RAN Cache 300 and the local CDN device 370 exchange pre-fetch information, and the RAN cache 300 performs pre-fetch by one of the pre-fetch mechanisms (either virtual UE or transit UE). The actual pre-fetch operation parameters (such as time of pre-fetch, which transit user session should be used for pre-fetch, etc.) may be determined by the RAN Cache 300 or by both RAN cache 300 and the local CDN device 370. Once these parameters are determined, the RAN Cache 300 pre-fetches the data using either of the modes described above. When the pre-fetched content is delivered to the RAN Cache 300, it is routed to the CDN device 370. In this scenario, RAN-Cache is providing a data-path using the Virtual-UE or transit-UE to do the pre-fetch operation, and the actual storage of pre-fetched objects and subsequent delivery to one more user requests are performed by the locally connected CDN. Dotted line 371 shows the pre-fetch datapath in this embodiment.

FIG. 4 shows the RAN cache 300 providing datapath connectivity for the local CDN device 370 to other CDN devices 375, 376 through the Wireless operator's Core Network 22

(SGSN, GGSN, S-GW, PDN-GW etc.) using the virtual UE component in the RAN cache 300. This example may also be performed using transit UE mode. In this example, the RAN cache 300 is deployed in operator's RAN network, and internet connectivity through a local offload interface is not available. A local connected CDN 370 needs to connect to other CDNs 375, 376. Any data accesses through Operator's Core Network 22 require the establishment of a UE session. Thus, the RAN Cache 300 emulates a virtual UE to establish a data session. Dotted line 372 shows the datapath between the CDN device 370 and the remote CDN device 376.

This operation may be performed as follows. The local CDN uses a Public-IP address to communicate with other co-operative CDNs (for example, other CDNs that belong to the same CDN vendor). In this way, the CDN devices discover and communicate among themselves using public IP addresses. However, the operator mobile network may use private IP addresses, and use the network address translation (NAT) function when the traffic sent/received through the internet. Thus, any traffic to/from local CDN that needs to be transported through the operator's mobile needs to be carried using private-ip addresses assigned by operator, whereas CDN devices use public-IP addresses. To facilitate CDN to CDN communication through the mobile-operator's network, the RAN-Cache emulates a transit UE with a operator configured static IP address, and uses well known NAT methods to carry the traffic through the operator network. The device performing the NAT function between GGSN and Internet is configured to remap the NAT addresses delivered by RAN-C to the public IP address that the local CDN is configured to use.

As an alternative to using NAT function in the RAN-C as described above, the RAN-C may use IP-in-IP by adding a locally operator-configured private IP address as an IP envelope to carry the CDN's public IP address. The device, for example, a router, in the operator mobile core network that routes the mobile traffic to the internet may be configured to remove the IP in IP encapsulation for the specific IP address and forward it using the local CDN's public IP address. Similarly, it may be configured to forward any traffic designated to local-CDN IP address by first encapsulating using IP in IP.

FIG. 5 shows a configuration similar to FIG. 4, however a traffic offload interface 380 is available for offloading portions of traffic through the offload interface 380 rather than going through the operator's core network 22. The RAN Cache 300 uses the offload interface 380 to service the pre-fetch requests from the local CDN device 370 and also to provide CDN connectivity.

This scenario is similar to the previous example, shown in FIG. 4, with the major difference being that it uses the offload interface to provide data path between CDN devices, rather than the mobile core network (CN). Since the traffic from the local CDN is not passing through the core network, the RAN-C does not need to perform IP-to-IP encapsulation and de-encapsulation functions, which is required when such traffic traverses the core network. It is important to note that RAN-C exchanges two types of traffic from the local CDN. The first is traffic that CDN intends to send to UEs through the RAN. The second type is traffic that the CDN communicates with other CDNs through the public internet. The RAN-Cache identifies and distinguishes these two type of datapaths using prior art IP methods, such as IP SRC, IP Destination, Source and Destination Port numbers and other methods.

When objects are pre-fetched and delivered from cache, or stored by a regular caching operation and delivered from cache, the origin servers lose "per user" statistics, summarization and click counts. To replace this information, the RAN Cache may maintain these counts. For example, the RAN Cache may count the number of iPhone users that downloaded a specific object. The RAN Cache may then provide this information to the origin servers. To protect the privacy of the users, the RAN Cache may anonymize (make anonymous) the user information such as IMSI, IMEI etc. This is done using prior-art methods, such as HTTP Post methods to co-operative sites. For example, the RAN Cache may remove the IMEI or IMSI and replace it with a random number to protect the user's privacy.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method of pre-fetching content data in a wireless radio access network (RAN) for improving Quality of Experience (QOE) to users, and for reducing delivery time for certain objects, wherein said RAN services a plurality of users, comprises a plurality of user sessions and wherein said RAN comprises a plurality of components and is in communication with a Core Network, comprising:
  a. inserting a device in said RAN, said device comprising a storage element, control logic and two interface modules, such that said device communicates with a first and a second component of said plurality of components;
  b. using said control logic in said device to interpret a communication from said first to said second component, so as to determine the user and the content of said communication, wherein said communication comprises a user session context;
  c. using said control logic to identify if said user session is being served from a local cache;
  d. if said user session is being served from a local cache, using said control logic to create requests for content data not specifically requested by said user session said requests constructed so as to appear to be sent by said user session;
  e. sending said data requests from said device to said Core Network; and
  f. storing the content delivered by said Core Network in response to said data request in said local cache,
  wherein said device maintains a counter for each of said user sessions, where each counter is incremented based on the number of bytes delivered from said local cache to a respective user session and is decremented based on the number of bytes prefetched from the Core Network to the local cache by said respective user session, and wherein said device selects a user session to use to create said data requests based on which of said counters has the greatest value.

2. A method of pre-fetching content data in a wireless radio access network (RAN) for improving Quality of Experience (QOE) to users, and for reducing delivery time for certain objects, wherein said RAN services a plurality of users, comprises a plurality of user sessions and wherein said RAN comprises a plurality of components and is in communication with a Core Network, comprising:

a. inserting a device in said RAN, said device comprising a storage element, control logic and two interface modules, such that said device communicates with a first and a second component of said plurality of components;

b. using said control logic in said device to interpret a communication from said first to said second component, so as to determine the user and the content of said communication, wherein said communication comprises a user session context;

c. using said control logic to identify if said user session is being served from a local cache;

d. if said user session is being served from a local cache, using said control logic to create requests for content data not specifically requested by said user session said requests constructed so as to appear to be sent by said user session;

e. sending said data requests from said device to said Core Network; and f. storing the content delivered by said Core Network in response to said data request in said local cache;

wherein said device determines the service plan for each of said user sessions, wherein said device selects a user session to use to create said data requests based on an amount of data included with said service plan.

3. The method of claim 1, further comprising:

determining the power source and remaining battery power for a user device associated with an active user session; and selecting a user session to use to create said data requests based on said power source and remaining battery power, so that said user session is likely to remain in the active state.

4. The method of claim 2, further comprising:

determining the power source and remaining battery power for a user device associated with an active user session; and selecting a user session to use to create said data requests based on said power source and remaining battery power, so that said user session is likely to remain in the active state.

* * * * *